US012669107B2

(12) United States Patent (10) Patent No.: US 12,669,107 B2
Grasso et al. (45) Date of Patent: Jun. 30, 2026

(54) WIND TURBINE BLADE

(71) Applicant: Vestas Wind Systems A/S, Aarhus (DK)

(72) Inventors: Francesco Grasso, Oporto (PT); Rens Christiaan Verhoef, Ringkøbing (DK); Gurmukh Singh, Skjern (DK); Dave Dent, Alderholt (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/549,367

(22) PCT Filed: Mar. 9, 2022

(86) PCT No.: PCT/DK2022/050040
§ 371 (c)(1),
(2) Date: Sep. 7, 2023

(87) PCT Pub. No.: WO2022/188936
PCT Pub. Date: Sep. 15, 2022

(65) Prior Publication Data
US 2024/0167450 A1 May 23, 2024

(30) Foreign Application Priority Data
Mar. 10, 2021 (DK) ............................ PA 2021 70108

(51) Int. Cl.
F03D 1/06 (2006.01)
(52) U.S. Cl.
CPC ......... F03D 1/0641 (2013.01); F03D 1/0687 (2023.08)
(58) Field of Classification Search
CPC .... F03D 1/0641; F03D 1/0687; F03D 1/0633; F03D 1/0675; F05B 2240/301; F05B 2240/302
See application file for complete search history.

(56) References Cited

U.S. PATENT DOCUMENTS 8,241,002 B2 * 8/2012 Wobben ................ F03D 1/0675
416/235
9,759,185 B2 9/2017 Bohlen
(Continued)

FOREIGN PATENT DOCUMENTS

CN 101684773 A 3/2010
CN 103097722 A 5/2013
(Continued)

OTHER PUBLICATIONS

Danish Patent and Trademark Office, examination report issued in corresponding DK Application No. PA 2021 70108, dated Jul. 9, 2021.
(Continued)

*Primary Examiner* — Courtney D Heinle
*Assistant Examiner* — Andrew Thanh Bui
(74) *Attorney, Agent, or Firm* — Wood Herron & Evans LLP

(57) ABSTRACT

A wind turbine blade having a length of at least 100 meters comprising: a root end (and a tip end, the blade extending in a spanwise direction from the root end to the tip end, the root end having a substantially circular profile with a root end diameter, and a profile of the blade transitioning into a lift generating profile moving in the spanwise direction from the root end towards the tip end; a leading edge and a trailing edge, the blade extending in a chordwise direction along a chord from the leading edge to the trailing edge; an inboard region extending in the spanwise direction from the root end to a distal end, the inboard region having a length defined between the root end and the distal end; wherein in the inboard region, the chord of the blade is within 5% of the root end diameter and the inboard region has a length of at least 10% span of the blade.

19 Claims, 5 Drawing Sheets

(56) References Cited

U.S. PATENT DOCUMENTS

| | | | |
|---|---|---|---|
| 10,138,867 B2 * | 11/2018 | Caruso | B29C 66/73921 |
| 10,495,056 B2 * | 12/2019 | Zamora Rodriguez | F03D 1/0633 |
| 12,129,832 B2 * | 10/2024 | Hansen | B29C 70/885 |
| 2010/0119374 A1 * | 5/2010 | Wood | F03D 1/0633 416/223 R |
| 2011/0020128 A1 * | 1/2011 | Fuglsang | F03D 1/0675 416/223 A |
| 2012/0020803 A1 | 1/2012 | Lees et al. | |
| 2012/0027588 A1 * | 2/2012 | Carroll | F03D 1/0641 416/223 R |
| 2014/0286787 A1 * | 9/2014 | Philipsen | F03D 1/0675 416/236 R |
| 2017/0241400 A1 * | 8/2017 | Whitehouse | F03D 1/0641 |
| 2017/0363060 A1 | 12/2017 | Bae et al. | |
| 2018/0266387 A1 * | 9/2018 | McMahon | F03D 1/0633 |
| 2019/0024631 A1 * | 1/2019 | Tobin | F03D 1/0641 |
| 2019/0032631 A1 | 1/2019 | Hoffmann | |
| 2020/0088161 A1 | 3/2020 | Carroll et al. | |

FOREIGN PATENT DOCUMENTS

| | | | |
|---|---|---|---|
| CN | 109642538 A | 4/2019 |
| EP | 3736437 A1 | 11/2020 |
| WO | 2007105174 A1 | 9/2007 |

OTHER PUBLICATIONS

International Searching Authority, International Search Report and Written Opinion issued in corresponding PCT Application No. PCT/DK2022/050040, dated Jun. 15, 2022.

European Patent Office, examination report issued in EP Application No. 22711151.5 dated Jan. 30, 2025.

European Patent Office, examination report issued in corresponding EP Application No. 22711151.5, mailed Dec. 15, 2025.

China National Intellectual Property Administration, office action issued in corresponding CN Application No. 202280033224. 5, Jan. 14, 2026.

* cited by examiner

WIND TURBINE BLADE

The present invention relates to a wind turbine rotor blade. In particular, the present invention relates to a wind turbine blade which has a length in excess of 100 metres and has beneficial structural characteristics in an inboard region of the blade near the root of the blade.

A wind turbine converts kinetic energy of the wind into electrical energy. A generator converts the wind energy captured by a rotor having one or more rotor blades into electrical energy that is usually supplied to a utility grid. The generator is housed in a nacelle together with the various components required to operate and optimize the performance of the wind turbine. A tower supports the load presented by the nacelle and the rotor. In a horizontal axis wind turbine (HAWT) the rotor blades extend radially outwardly from a central hub which rotates about a longitudinal axis aligned generally horizontally. In operation, the blades are configured to interact with the passing air flow to produce lift that causes the rotor to rotate within a plane substantially perpendicular to the direction of the wind. A conventional rotor blade is made from an outer shell and one or more inner spars in a hollow space bounded by the outer shell. The one or more spars serve to transfer loads from the rotating blade to the hub of the wind turbine. Such loads include tensile and compressive loads directed along the length of the blade arising from the circular motion of the blade and loads arising from the wind which are directed in a thickness direction of the blade, i.e. from the windward side of the blade to the leeward side. The spars may typically have a hollow tubular section, e.g. a generally rectangular hollow tubular section or it may be an I-beam or a C-beam for example with one or more shear webs extending between spar caps. The spar caps may be incorporated into the outer shell or may be attached to the outer shell.

The general trend in the wind turbine industry has been for wind turbine blades to be made longer. The longer blades, the larger the rotor and the more wind energy that can be captured, improving the efficiency of an individual wind turbine. However, the increasing lengths of rotor blades lead to an increase of structural loading on the rotor blade and an increase in the mass of the blades.

It is an aim of the present invention to provide a structurally efficient wind turbine blade with a low mass.

SUMMARY OF INVENTION

According to the present invention there is provided a wind turbine blade having a length of at least 100 meters comprising: a root end and a tip end, the blade extending in a spanwise direction from the root end to the tip end, the root end having a substantially circular profile with a root end diameter, and a profile of the blade transitioning into a lift generating profile moving in the spanwise direction from the root end towards the tip end; a leading edge and a trailing edge, the blade extending in a chordwise direction along a chord from the leading edge to the trailing edge; an inboard region extending in the spanwise direction from the root end to a distal end, the inboard region having a length defined between the root end and the distal end; wherein in the inboard region, the chord of the blade is within 5% of the root end diameter and the inboard region has a length of at least 10% span of the blade.

The blade of the present invention has a geometry where in the inboard region, the chord of the blade is substantially constant. The expression "within 5%" means that the chord in the inboard region can vary up to plus or minus 5% of the root end diameter. For example, if the diameter of the root end is 5 metres, the chord in the inboard region can be between 4.75 metres and 5.25 metres and not be outside of this range.

Providing the blade with a substantially constant chord in the inboard region provides a number of advantages relating to the structural efficiency of the blade in the inboard region. The blade geometry is straighter which allows for more efficient load paths from the tip of the blade toward the root of the blade. In particular, the trailing edge follows a substantially straight line in the inboard region which reduces the risk of trailing edge buckling, or peel forces on adhesive joints at the trailing edge. The substantially constant chord also leads to less material being used on the blade and hence a reduced mass. On blades that are over 100 metres in length, the loads on the blades are very high due to the extreme lengths of the blades. By providing the efficient load paths in substantially straight lines, large blades can be produced without using excessive amounts of material in load critical areas.

Very long blades, i.e. those in excess of 100 meters in length, may be difficult to transport. By providing a blade with a substantially constant chord, the area of the blade is constrained which allows a plurality of blades to be stacked together in a close arrangement. This is particularly beneficial on marine vessels where blades are stacked in an array. For an offshore windfarm, by allowing more blades to be stacked on a single vessel, fewer journeys are needed between a port and the offshore windfarm.

The length of the inboard region may be at least 20% span of the blade. In other words, the chord of the blade is substantially constant for at least 20% span of the blade. Alternatively, the length of the inboard region may be at least 15% span, 25% span or 30% span. By increasing the spanwise length of the inboard region, a more structurally efficient blade can be achieved. However, increasing the length of the inboard region too far may lead to a reduction in the aerodynamic performance of the blade. Therefore, preferably, the length of the inboard region is less than 35% span of the blade.

In the inboard region, the chord of the blade may be within 2% of the root end diameter, or within 1.5% of the root end diameter or within 1% of the root end diameter. This results in the chord of the inboard region being kept within a narrow margin of the root diameter which will increase the structural efficiency of the inboard region.

At the distal end of the inboard region, a thickness to chord ratio of the blade profile may be less than 75%, or it may be less than 60%, or it may be less than 55%, or it may be less than 50%. Preferably, at the distal end of the inboard region, the thickness to chord of the blade profile is less than 50%, such as 45%. At the root end, the blade has a substantially circular profile and so the thickness to chord ratio at the root end is 100%. By decreasing the thickness to chord ratio along the inboard region, the profile can transition into a more aerodynamic lift generating shape. With a more rapid decrease in the thickness to chord ratio, the aerodynamic properties of the blade can be improved closer to the root end.

Preferably, in the inboard region, a thickness to chord ratio of the blade profile strictly decreases from 3% span or less to the distal end of the inboard region. Although the blade has a substantially constant chord in the inboard region, by ensuring that the thickness to chord ratio is always decreasing means that the profile can rapidly transition to a more effective lift generating profile.

Preferably, the chord of the blade from the root end to the tip end is never greater than the root end diameter. This means than for the full spanwise length of the blade, the chord is never greater than the root diameter. This helps to provide a straight load path along the trailing edge which further reduces the risk of trailing edge buckling, or peel forces on adhesive joints at the trailing edge.

Preferably, the chord decreases monotonically from the root end to the tip end. In other words, the chord of the blade never increases when moving from the root end to the tip end. Advantageously, this provides a straight load path along the trailing edge in the inboard region.

Preferably, in the inboard region, the blade comprises a profile having a flatback trailing edge. The provision of a profile with a flatback trailing edge allows for the blade section to be thicker increasing its structural strength. In addition, the flatback airfoil has beneficial aerodynamic properties which compensate for the loss of chord length in the inboard region.

When viewed in plan view, the leading edge may have a concave shape. The concave shape may extend from the root end to the tip end of the blade. Advantageously, this allows reinforcing structures in the blade to be positioned at optimum positions in the blade so that the second moment of inertia of each blade section is maximised. The leading edge does not necessarily have to be curved in plan view, it may be made up of straight sections which together contribute to the concave shape.

The expression "when viewed in plan view" means that the observer is looking down on the blade toward the suction side or towards the pressure side. In other words, the observer is looking in a thickness direction of the blade. The blade may be twisted along its spanwise length, or it may be prebent, but still the observer is viewing down on the suction or pressure side of the blade.

When viewed in plan view the trailing edge and/or the leading edge may follow a substantially straight line in the inboard region. Advantageously, this leads to straighter and more efficient load paths in the inboard region which prevents the risk of structural damage to the blade.

In the present specification, where the term "substantially straight line" is used, this means either a straight line or a line with minimal deviation. The blade may be twisted along its spanwise length, or it may be prebent, so that when viewed in directions which are not in plan view, the line may not be straight. For example, if the blade has prebend and the entire blade is curved toward the pressure side, the trailing edge and the leading edge would follow this prebend curve when viewing the blade in a chordwise direction towards the leading edge or the trailing edge. However, as described, the reference to substantially straight line is taken with respect to a view of the blade in plan view, in a thickness direction.

The blade may comprise a main reinforcing structure and a rear reinforcing structure, and the rear reinforcing structure may be substantially straight in plan view. The rear reinforcing structure may run adjacent to the trailing edge. Advantageously, by providing a rear reinforcing structure which is straight means that loads on the blade can be transferred efficiently to the root of the blade so that material usage is minimised. The main reinforcing structure and/or the rear reinforcing structure may comprise spar caps. Preferably the spar caps include pultruded fibrous strips of material such as pultruded carbon fibre composite material. A straight reinforcing structure which is made from pultruded strips is beneficial as it does not require the strips to bend in an in-plane direction.

Vortex generators may be positioned on a suction side in the inboard region of the blade. The vortex generators are used to make the profile of the blade in the inboard region robust against surface roughness and maintain the aerodynamic properties of the blade in the event of surface roughness at the leading edge of the blade.

A horizontal axis wind turbine may be provided comprising a rotor having at least one blade as described above. The rotor may comprise a plurality of blades, such as three blades, which are connected at their root ends to a hub.

In this specification, terms such as leading edge, trailing edge, pressure side, suction side, thickness, and chord are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor. The term trailing edge is used to refer to an edge of a wind turbine blade which will be at the back of the blade as the blade rotates in the normal rotation direction of the wind turbine rotor. The trailing edge has a fixed geometry.

The chord of a blade is the straight line distance from the leading edge to the trailing edge in a given cross section perpendicular to the blade spanwise direction. In the case of a cross section having a flatback trailing edge, the chord is defined between the leading edge and the middle of the flatback.

A pressure side (or windward side) of a wind turbine blade is a side of the blade between the leading edge and the trailing edge, which, when in use, has a higher pressure than a suction side of the blade. A suction side (or leeward side) of a wind turbine blade is a side of the blade between the leading edge and the trailing edge, which will have a lower pressure acting upon it than that of a pressure side, when in use.

The thickness of a wind turbine blade is measured perpendicularly to the chord of the blade and is the greatest distance between the pressure side and the suction side in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

BRIEF DESCRIPTION OF THE DRAWINGS

In order that the present invention may be more readily understood, the invention will now be described, by way of example only, and with reference to the following Figures, in which.

DETAILED DESCRIPTION OF THE INVENTION

Figure 1:
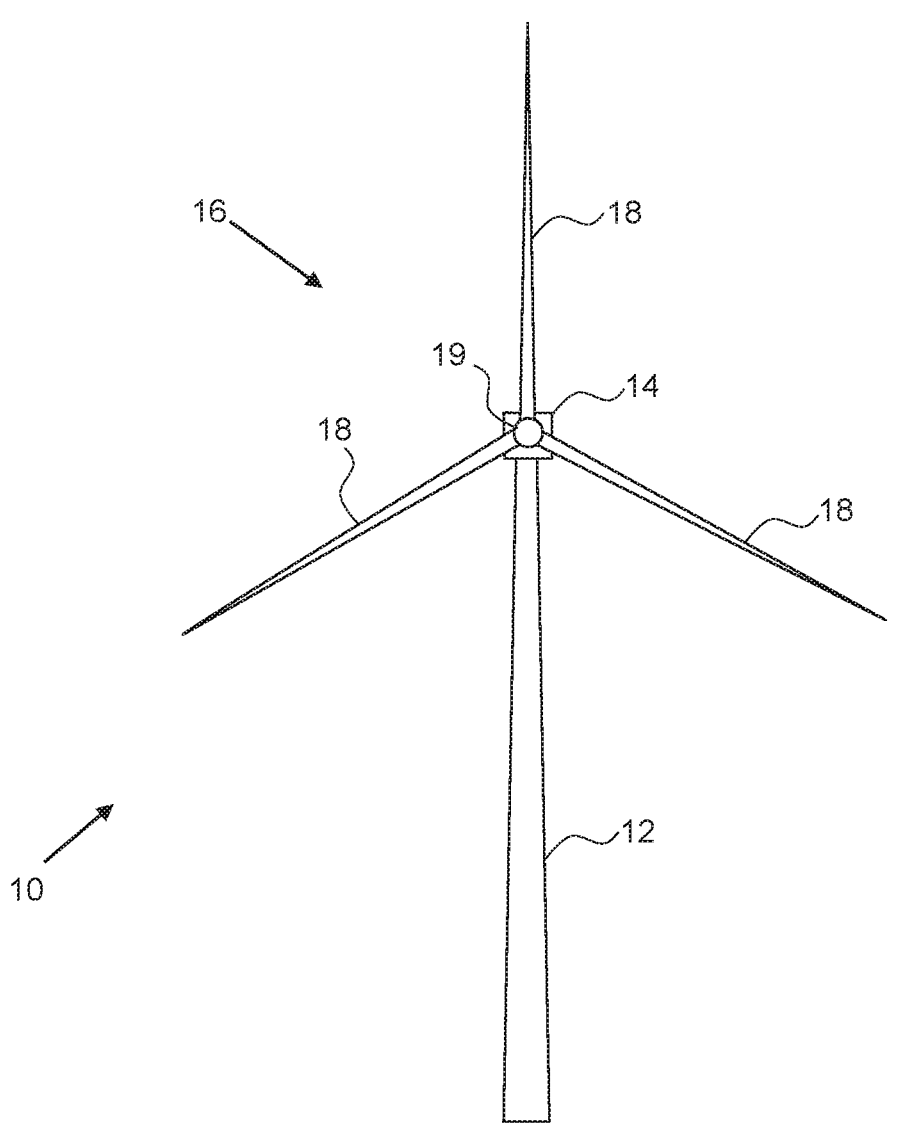
FIG. 1 is a view of a horizontal axis wind turbine.

FIG. 1 shows a horizontal axis wind turbine 10. The wind turbine 10 comprises a tower 12 supporting a nacelle 14 to which a rotor 16 is mounted. The rotor 16 comprises a plurality of wind turbine blades 18 that extend radially from a central hub 19. In this example, the rotor 16 comprises three blades 18.

Figure 2A:
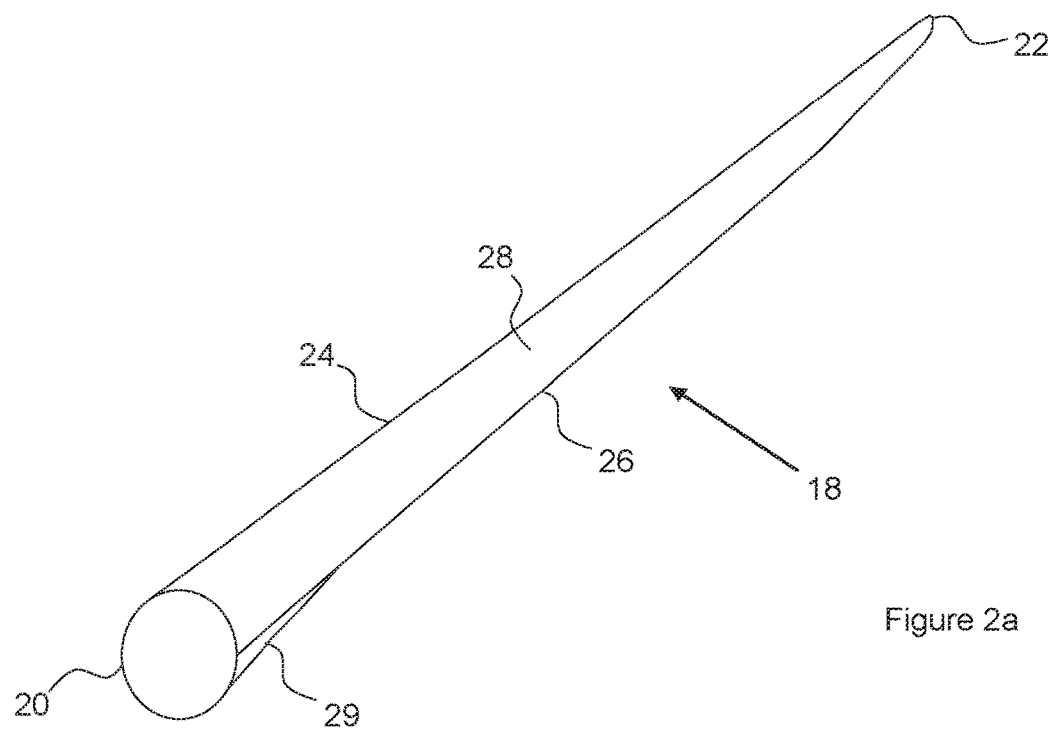
FIG. 2*a* is a perspective view of a wind turbine blade according to the invention and FIG. 2*b* is a plan view of the blade in FIG. 2*a;*

FIG. 2a is a perspective view of one of the blades 18 according to the invention (referred to here as an 'improved blade' to distinguish it from a blade of the prior art described below). The improved blade 18 extends from a generally circular root end 20 to a tip end 22 in a longitudinal spanwise direction, and between a leading edge 24 and a trailing edge 26 in a transverse chordwise direction. The improved blade 18 comprises a shell formed primarily of fibre-reinforced plastic (FRP). The blade 18 comprises a suction side 28 and a pressure side 29.

The improved blade 18 transitions from a circular profile to an airfoil profile moving away from the root end 20 of the blade 18 towards the tip end 22. The improved blade 18 has a profile of progressively decreasing thickness towards the tip end 22. A chord line connects the leading edge 24 and the trailing edge 26. At the root end 20, the diameter of the circular profile can be equated to the chord at this section. The root end 20 of the blade may be attached to the hub 19 via bolts.

Figure 2B:
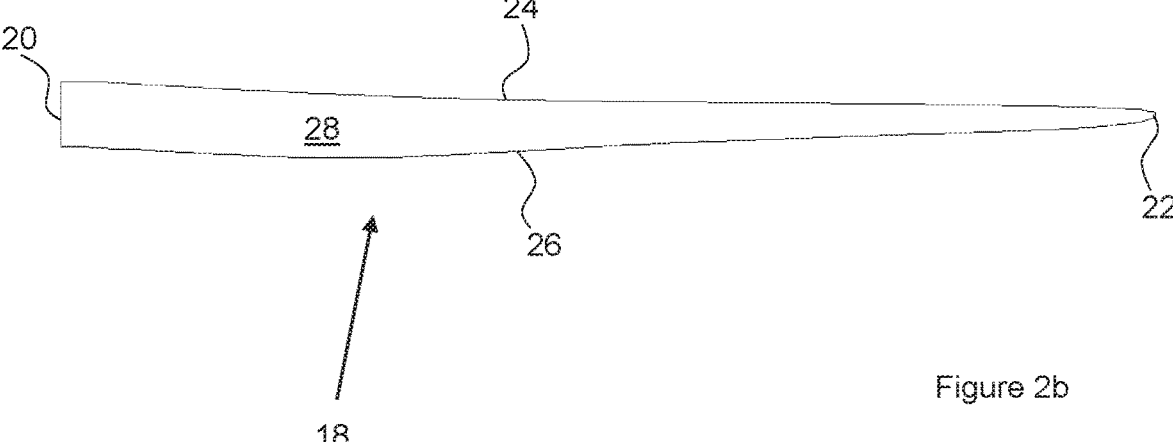

FIG. 2b is a plan view of the improved blade 18 shown in FIG. 2a looking down on the suction side 28.

Figures 3A, 3B:
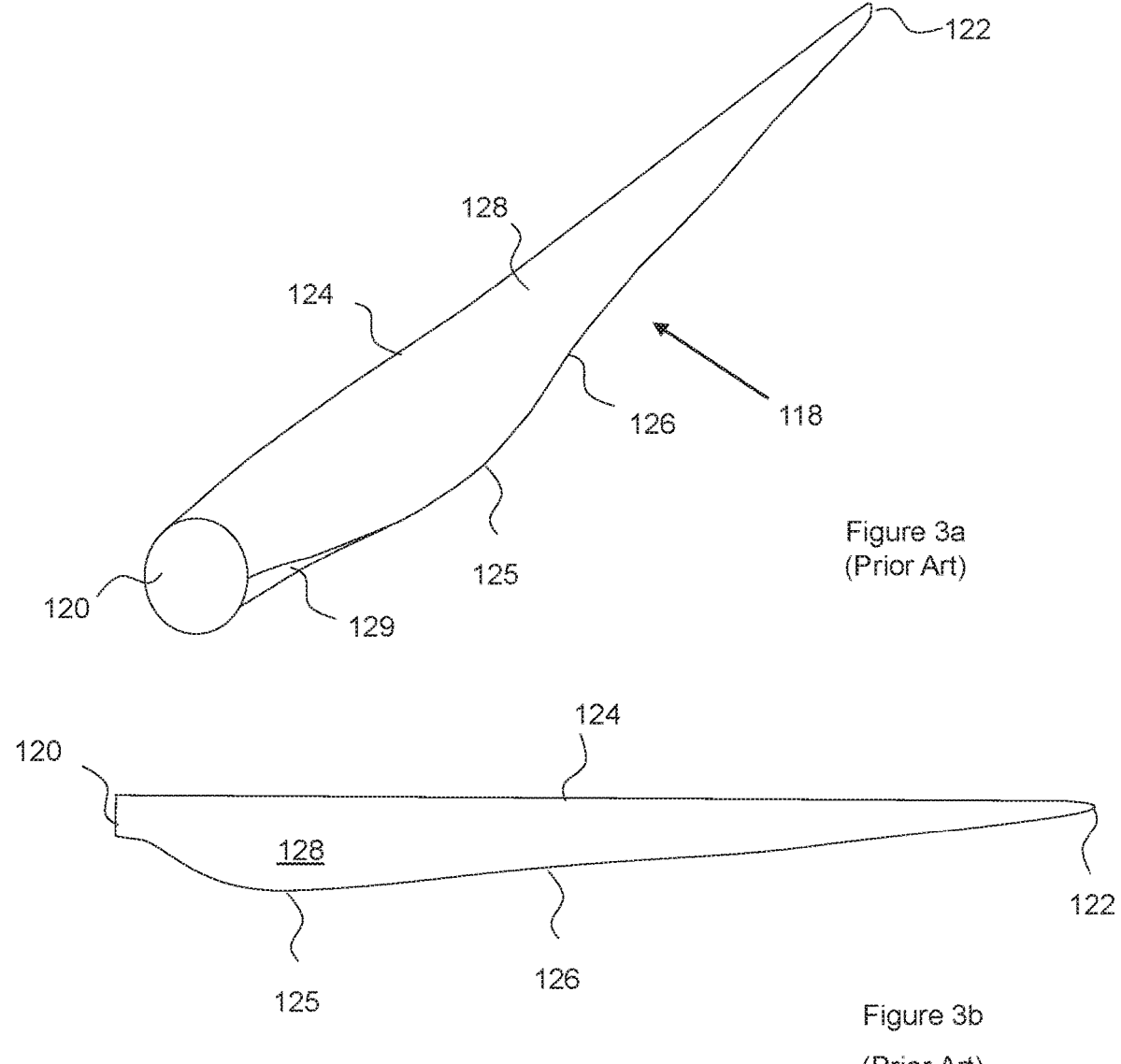
FIG. 3*a* is a perspective view of a wind turbine blade according to the prior art and FIG. 3*b* is a plan view of the blade in FIG. 3*a;*

For comparison, FIGS. 3a and 3b show a conventional wind turbine blade 118 according to the prior art. In the conventional blade 118 of FIGS. 3a and 3b, the conventional blade extends from a generally circular root end 120 to a tip end 122 in a longitudinal spanwise direction, and between a leading edge 124 and a trailing edge 126 in a transverse chordwise direction. The conventional blade 118 comprises a suction side 128 and a pressure side 129.

The conventional blade 118 transitions from a circular profile to an airfoil profile moving from the root end 120 of the conventional blade 118 towards a shoulder 125 of the conventional blade 118, which is the widest part of the conventional blade 118 where the conventional blade 118 has its maximum chord. The conventional blade 118 has an airfoil profile of progressively decreasing thickness in an outboard portion of the conventional blade 118, which extends from the shoulder 125 to the tip 122 of the conventional blade 118.

Compared to the conventional blade 118 (shown in FIGS. 3a and 3b) it can be seen that the improved blade 18 (shown in FIGS. 2a and 2b) has some differences. Firstly, the improved blade 18 has no shoulder, as there is no position of maximum chord outboard from the root end. Secondly, there is a spanwise length of the blade, starting from the root end, where the chord length is substantially constant. Thirdly, the leading edge of the blade has a concave shape when seen in plan view.

Figure 4:
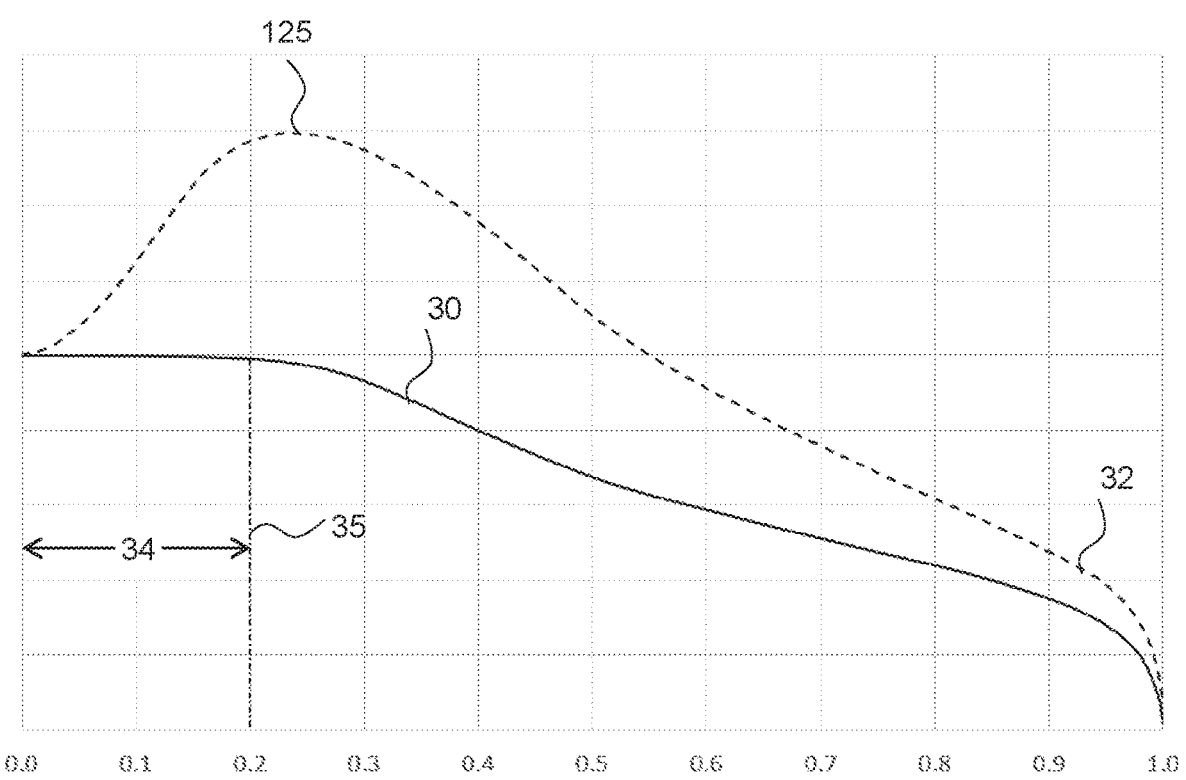
FIG. 4 shows the chord distribution of the blade.

FIG. 4 shows a graph of the chord distribution of the improved blade 18 and a conventional blade 118 for comparison along their spanwise length. In this Figure, the X axis represents the length of the blade where 0.0 is at the root end and 1.0 is at the tip end. The Y-axis represents the chord length. The chord distribution of the two blades has been normalised with respect to the diameter of the root end of the respective blades.

Solid line 30 is the chord distribution of the improved blade 18 and dashed line 32 is the chord distribution of the conventional blade 118. As can be seen from the dashed line 32, the chord of the conventional blade 118 increases from the root end until it reaches the shoulder 125 of the blade, whereupon the chord length decreases towards the tip of the blade. The chord of the improved blade 18 shown by the solid line 30 does not increase to a shoulder, instead the chord remains substantially constant over a certain length of the blade, moving away from the root end of the blade, before decreasing towards the tip of the of the blade.

An inboard region 34 of the improved blade 18 is defined as extending from the root end of the blade 20 to a distal end 35. It should be noted that the distal end of the inboard region is located at a point intermediate on the blade span, and is not located at the tip end of the blade. In the inboard region 34, the chord of the blade 18 is within 5% of the diameter of the root end of the blade. In other examples, within the inboard region, the chord of the improved blade 18 is within 3%, 2%, 1.5% or 1% of the diameter of the root end of the blade The distal end 35 of the of the inboard region 34 is marked in FIG. 4 by the dot-dashed vertical line, and in this example is at 20% span. However, the distal end of the inboard region may be located from 10% to 30% span, for example.

The improved blade 18 thus has an inboard region 34 where the chord length is substantially the same as the diameter of the root end. This has been found to improve the transfer of loads along the blade (from the tip end to the root end) as compared to a conventional blade where there is a shoulder with a maximum chord. In particular, the loads on the improved blade in use, as it is rotating on a wind turbine, can follow a substantially straight load path into the root end of the blade and the hub. On a large wind turbine blade with a length in excess of 100 meters this results in an efficient transfer of loads so that less material can be used in the blade (and thus the mass of the blade will be reduced) and at the same time the risk of damage to the blade at the trailing edge is significantly reduced as explained further below.

Figure 5:
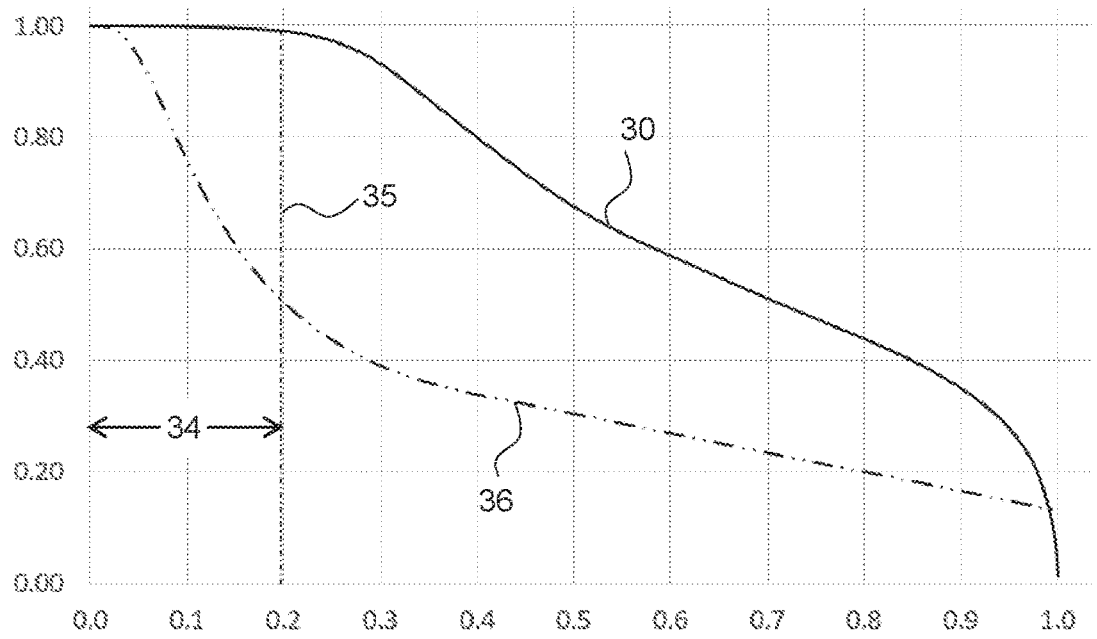
FIG. 5 shows the chord distribution and the thickness distribution of the blade.

FIG. 5 shows a graph of the chord distribution 30 and the thickness to chord ratio distribution 36 of the improved blade 18 along its spanwise length. In this Figure, the X axis represents the length of the blade where 0.0 is the root end and 1.0 is the tip end. The Y-axis represents the chord length and the thickness to chord ratio. The chord length has been normalised to the root diameter of the blade. At the root end, the blade has a circular cross section so that the thickness to chord ratio is 1.0 (or 100%).

While the chord of the improved blade 18 in the inboard region (which is defined between the root end and its distal end 35) is substantially constant, the thickness to chord ratio in the inboard region decreases moving from the root end to the tip end. In this example, it can be seen that the thickness to chord ratio at the distal end 35 of the inboard region is approximately 50%. In other words, the inboard region is not simply a cylinder with a constant cross section along its length. Instead, in the inboard region 34, the blade is transitioning from the circular root end 20 to a lift generating airfoil profile.

As can be seen in FIG. 5, the thickness to chord ratio 36 in the inboard region strictly decreases (i.e. strictly monotone) from about 3% to the distal end 35 of the inboard region. Between 0% span and about 3% span (or less) the root of the blade may comprise metal bushings to bolt the blade to the hub. Therefore, in the very inboard part of the blade (e.g. 0% span to 3% span) it may be necessary to keep a constant cross section to account for the metal bushings.

The metal bushings may only extend to, say, 1% span, and therefore the thickness to chord ratio will strictly decrease after this point.

Figures 6A, 6B:
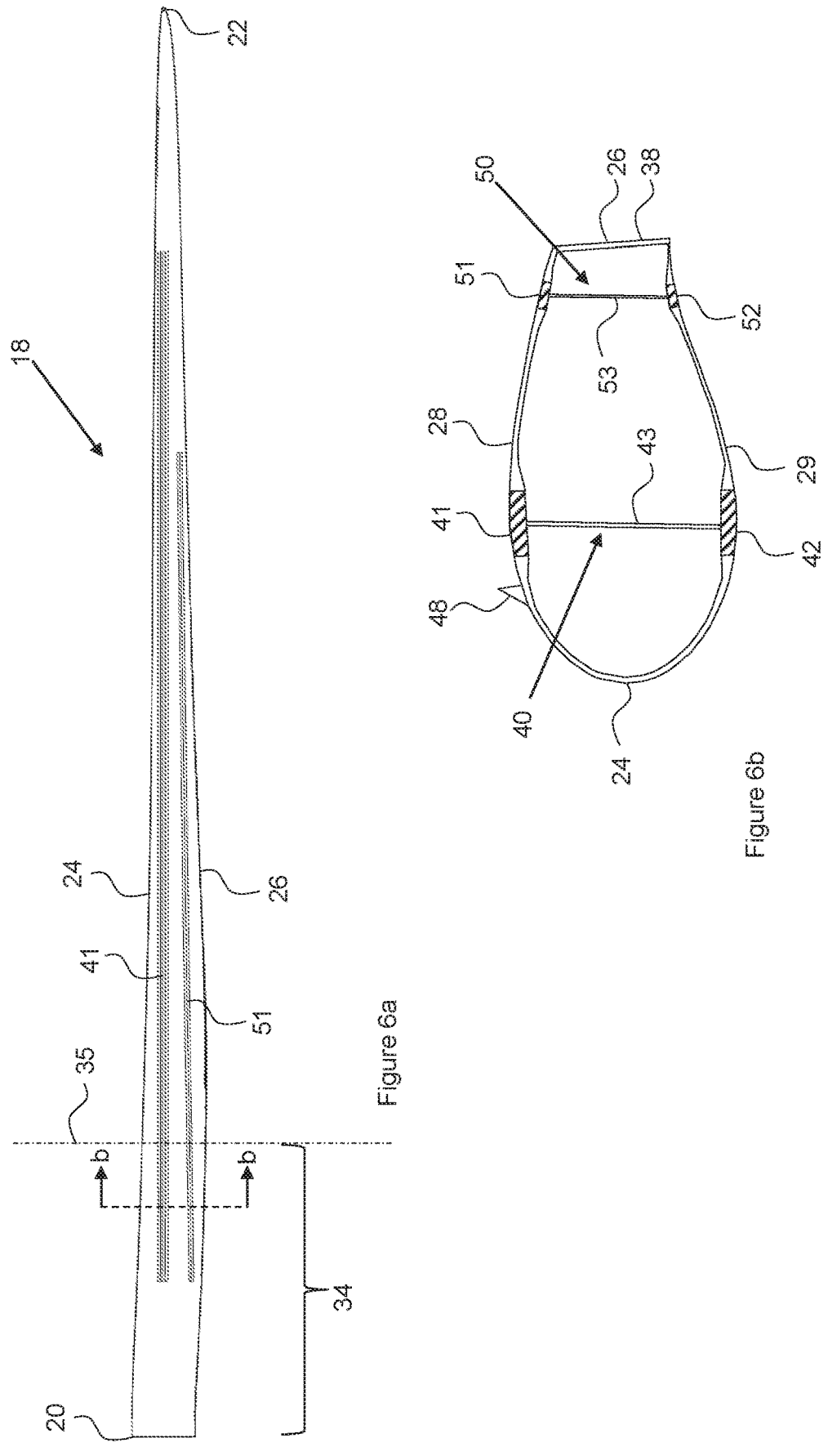
FIG. 6*a* shows a plan view of the blade and FIG. 6*b* is a cross section along the line b-b.

FIG. 6a shows a plan view of the improved blade 18 and FIG. 6b shows a cross section along the line b-b. The improved blade 18 includes an outer shell formed of the suction side 28 and the pressure side 29, which together define a hollow interior space.

The outer shell may be two half-shells which are separately moulded before being joined together (at the leading edge 24 and the trailing edge 26) to form the blade 18. It will be appreciated that the blade shell need not be formed as two half-shells which are subsequently joined together but may be formed as a unitary shell structure in a "one shot" single shell process. The blade shell may include a laminate composite material such as glass fibre and/or carbon fibre for example.

The inboard region of the improved blade is identified by reference numeral 34 and the distal end of the inboard region is identified by reference numeral 35.

Compared to the conventional blade, the improved blade 18 has a reduced chord length in the inboard region 34. This may be achieved by truncating the trailing edge side of the profile in the inboard region to create a flatback trailing edge.

As can be seen in FIG. 6b, the profile does not have a pointed trailing edge and instead the blade has a blunt trailing edge, where the rear of the profile is truncated to form the flatback trailing edge. Here, the pressure and suction sides 28, 29 are joined by a trailing edge surface 38 of the blade. The trailing edge surface 38 may be perpendicular to the chord line C of the blade, which joins the leading and trailing edges 24, 26, or it may be set an angle as shown in FIG. 6b. For a profile with a blunt trailing edge, the chord is defined between the leading edge and the middle of the trailing edge surface 38.

It should be noted that the term "flatback" also encompasses a profile where the trailing edge surface 38 has some curvature in a plane perpendicular to the spanwise direction of the blade, e.g. the trailing edge panel may have a convex shape in cross section when viewed from outside the blade so that it bulges outwardly away from the leading edge.

The chord of the improved blade 18 in the inboard region 34 is decreased compared to a conventional blade which would normally result in a loss of aerodynamic lift due to the reduced surface area of the blade. However, the flatback profile used in the improved blade 18 compensates for this loss of lift as the thickened trailing edge actually results in an increased lift force as pressure recovery occurs in the wake of the blade. Furthermore, the thickened trailing edge also results in a blade profile that is less sensitive to roughness (e.g. leading edge erosion or soiling) as adverse pressure gradients are reduced along the chord of the blade profile.

As noted above the root end 20 of the improved blade 18 has a circular cross section. The blade's profile then transitions into a cross section having a flatback trailing edge. The height of the flatback (that is its dimension in the thickness direction of the blade) decreases moving from the root end towards the tip end of the improved blade. At a certain point (such as at 40% span) the flatback height has decreased to zero so that the blade's cross section has a conventional airfoil profile with a pointed trailing edge.

Also, as can be seen in FIG. 6b, at the position of the blade shown, the blade has an airfoil cross section. In the example of FIG. 6b, the thickness to chord ratio as shown is just over 50%, and this thickness to chord ratio will reduce moving towards the tip of the blade. In an example, the thickness to chord ratio at the distal end of the inboard region may be 50% or less, such as 45%. Airfoils with these thickness to chord ratios will still generate lift and so the inboard region will contribute to the lift generation of the blade.

The blade 18 in this example comprises a first reinforcing structure 40 and a second reinforcing structure 50. The first reinforcing structure 40 (which may also be referred to as a main reinforcing structure or a main spar structure) comprises a main suction side spar cap 41 located on the suction side and a main pressure side spar cap 42 located on the pressure side.

A shear web 43 joins the main spar caps 41 and 42. The main spar caps 41, 42 of the first reinforcing structure 40 may extend substantially along the full spanwise length of the blade 18 from the inboard region 34 towards the tip end 22. The main spar caps 41, 42 may include pultruded fibrous strips of material such as pultruded carbon fibre composite material or other carbon fibre reinforced plastic material.

In the example shown in FIGS. 6a and 6b, the main spar structure 40 comprises an I-beam configuration where a single shear web 43 is located between two main spar caps 41, 42. However, other configurations are possible, such as two shear webs located between opposing spar caps, or two main spar caps which are closely arranged on each of the suction side and the pressure side, with respective shear webs extending between the suction side and the pressure side.

The second reinforcing structure 50 (which may also be referred to as a rear reinforcing structure or a trailing edge reinforcing structure or a trailing edge spar) comprises a rear suction side spar cap 51 located on the suction side and a rear pressure side spar cap 52 located on the pressure side. A trailing edge shear web 53 joins the rear spar caps 51 and 52. The rear spar caps 51, 52 of the second reinforcing structure 50 may extend along the length of the blade 18 from the inboard region 34 to a mid-point on the blade. The rear spar caps 51, 52 may include pultruded fibrous strips of material such as pultruded carbon fibre composite material or other carbon fibre reinforced plastic material.

In this example, a trailing edge shear web 53 is shown connecting the rear spar caps of the second reinforcing structure 50. However, in other example, there may be no trailing edge shear web and instead the rear spar caps are in the form of stringers.

The main spar caps and the rear spar caps predominately carry the flap wise loads that act on the blade in use. The main spar caps and the rear spar caps may be incorporated into the outer shell of the blade as shown in FIG. 6a, or they may be attached to the outer shell. The shear webs may be formed from glass fibre reinforced plastic material and may be adhesively bonded to the surfaces of the spar caps.

The rear spar caps comprise unidirectional fibre material, and are preferably formed from pultruded strips of carbon fibre reinforced plastic. These pultruded strips are arranged in a stack to form each rear spar cap. The pultruded strips may have a width (in a chordwise direction of the blade) of the order of 100 mm and they may have a thickness (in the thickness direction of the blade) of the order of 5 mm. In an example, eight pultruded strips may be stacked together to form the rear spar caps. The pultruded strips are pre-cured items and due to their geometry, when they are laid up into a blade mould, they will lie in a straight configuration on the mould surface, and it is not possible to bend them in the chordwise direction of the blade. As can be seen in FIG. 6a, the spar caps are substantially straight in the spanwise direction of the blade, in plan view.

During operation, the rotor blades of a horizontal axis wind turbine rotate through a substantially vertical plane. The weight of the rotor blade itself generates alternating tensile and compressive forces along its length as it rotates which results in cyclic loading of each rotor blade. In particular, the alternating tensile and compressive forces are experienced along the leading edge of a blade and along the trailing edge of a blade. These loads are commonly referred to in the art as "edgewise loads" The edgewise loads are a result of gravitational loading and this edgewise loading increases from the tip of the blade to the root of the blade. Edgewise loads are experienced by both the leading and trailing edges. However, as the trailing edge is positioned further from the neutral axis of the rotor blade it experiences higher edgewise stresses than the leading edge.

The improved blade 18 has a relatively straight trailing edge (compared to the conventional blade) in the inboard region 34 so that the distance between the rear reinforcing structure 50 and the trailing edge 26 can be kept low. This low distance results in less strain along the trailing edge and so the risk of edgewise buckling of the trailing edge is reduced or eliminated. In particular, when the trailing edge 26 is under a compressive load, the trailing edge is unlikely to buckle due to its proximity to the rear reinforcing structure 50. Furthermore, strains along the trailing edge 26 are reduced as it is closer to the neutral axis of the improved blade (compared to the conventional blade).

The straightened trailing edge 26 of the improved blade 18 (compared to the curved trailing edge 126 of the conventional blade) is also advantageous because it prevents a failure mechanism known in the art as 'breathing'. In the conventional blade 118, as it rotates, alternating tensile and compression loads are experienced along the trailing edge of the blade. The shoulder 125 presents a curved load path along the trailing edge 126. When the trailing edge 126 experiences tensile loads, the trailing edge at the shoulder 125 experiences a chordwise force pulling it towards the leading edge. When the trailing edge 126 experiences compressive loads, the trailing edge at the shoulder 125 experiences a chordwise force pushing it away from the leading edge.

When the trailing edge 126 at the shoulder 125 experiences these chordwise forces during edgewise loading, the shell of the blade between the trailing edge and a rear reinforcing structure deforms out of plane. That is, the blade skin between a rear spar and the shoulder deforms out of plane in the thickness direction of the blade which is the phenomenon known as 'breathing'. This deformation can lead to peeling stresses at the adhesive bondlines at the trailing edge 126 of the blade which may lead to a structural failure. To avoid this on conventional blades, the trailing edge can be over laminated with glass fibre reinforced plastic on the outside and/or the inside of the blade to provide increased strength in this area.

The improved blade 18 straightens out the trailing edge 26 (as compared to the highly curved shoulder 125 of the conventional blade) and thus provides a straight load path along the trailing edge into the root end of the blade. Consequently, the trailing edge 26 of the improved blade 18 does not experience any significant forces in a chordwise direction and so the breathing phenomenon is avoided. This means that the trailing edge does not have to be over laminated which reduces the mass of the improved blade and reduces the manufacturing time of the blade.

From the plan view of FIG. 6a, it can be seen that the leading edge 24 of the improved blade 18 has a concave shape and that it bends towards the trailing edge 26. In other words, when viewing the improved blade from either the suction side 28 or the pressure side in a thickness direction of the blade, the leading edge 24 curves inwardly. This is in contrast to a conventional blades where leading edges tend to bulge outwardly away from the trailing edge as the chord increases in the shoulder region. By providing the improved blade 18 with a concave leading edge 24 means that the main spar caps can be orientated in a straight line which improves the manufacturability of the blade. It is also advantageous to provide the main spar caps at the thickest part of the blade profile so as to maximise the second moment of inertia of each cross section of the blade. Providing the leading edge 24 with a concave shape allows for the optimum position of the main spar caps.

Vortex generators may be positioned on the suction side 28 in the inboard region 34 of the improved blade 18. Referring to FIG. 6b, a vortex generator 48 is shown schematically on the suction side 28. The vortex generators may be positioned in a line from the root end 20 and extend for the length of the inboard region 34 to the distal end 35. The vortex generators 48 may also extend past the distal end 35. The vortex generators are provided to prevent the loss of aerodynamic performance of the flatback profiles due to surface roughness (for example, leading edge erosion, contamination or insects).

Referring again to FIG. 4, it can be seen that the planform of the improved blade 18 is smaller than the planform of the conventional blade 118, and this is mainly due to the absence of the shoulder on the improved blade 18. A smaller planform results in less material being used in the production of the blade and hence a lower mass blade. A lower mass blade will impart lower loads to the hub, nacelle and tower and so the mass of the entire wind turbine can be reduced. Moreover, as the improved blade 18 has a smaller planform, it will experience lower aerodynamic loads leading to less stress on the blades and the rest of the wind turbine structure.

Many modifications may be made to the example described above without departing from the scope of the present invention as defined in the accompanying claims.

The invention claimed is:

1. A wind turbine blade having a length of at least 100 meters comprising:
   a root end and a tip end, the blade extending in a spanwise direction from the root end to the tip end, the root end having a circular profile with a root end diameter, and a profile of the blade transitioning into a lift generating profile moving in the spanwise direction from the root end towards the tip end;
   a leading edge and a trailing edge, the blade extending in a chordwise direction along a chord from the leading edge to the trailing edge; and
   an inboard region extending in the spanwise direction from the root end to a distal end, the inboard region having a length defined between the root end and the distal end;
   wherein in the inboard region, the chord of the blade is within 5% of the root end diameter and the inboard region has a length of at least 10% span of the blade; and
   wherein in the inboard region a thickness to chord ratio of the blade profile strictly decreases from 3% span or less to the distal end of the inboard region.

2. The wind turbine blade according to claim 1, wherein the inboard region has a length of at least 20% span of the blade.

3. The wind turbine blade according to claim 1, wherein the inboard region has a length less than 35% span.

4. The wind turbine blade according to claim 1, wherein in the inboard region, the chord of the blade is within 2% of the root end diameter.

5. The wind turbine blade according to claim 1, wherein at the distal end of the inboard region, a thickness to chord ratio of the blade profile is less than 75%.

6. The wind turbine blade according to claim 1, wherein at the distal end of the inboard region, a thickness to chord ratio of the blade profile is less than 55%.

7. The wind turbine blade according to claim 1, wherein the chord of the blade from the root end to the tip end is never greater than the root end diameter.

8. The wind turbine blade according to claim 1, wherein the chord decreases monotonically from the root end to the tip end.

9. The wind turbine blade according to claim 1, wherein in the inboard region the blade comprises a profile having a flatback trailing edge.

10. The wind turbine blade according to claim 1, wherein when viewed in plan view, the leading edge has a concave shape.

11. The wind turbine blade according to claim 1, wherein when viewed in plan view the trailing edge and/or the leading edge follow a substantially straight line in the inboard region.

12. The wind turbine blade according to claim 1, the blade comprising a main reinforcing structure and a rear reinforcing structure, the rear reinforcing structure being substantially straight in plan view.

13. The wind turbine blade according to claim 1, wherein vortex generators are positioned on a suction side in the inboard region of the blade.

14. A horizontal axis wind turbine comprising a rotor having at least one blade according to claim 1.

15. The wind turbine blade according to claim 1, wherein the inboard region has a length of at least 25% span of the blade.

16. The wind turbine blade according to claim 1, wherein the inboard region has a length of at least 30% span of the blade.

17. The wind turbine blade according to claim 1, wherein in the inboard region, the chord of the blade is within 1.5% of the root end diameter.

18. The wind turbine blade according to claim 1, wherein in the inboard region, the chord of the blade is within 1% of the root end diameter.

19. The wind turbine blade according to claim 1, wherein at the distal end of the inboard region, a thickness to chord ratio of the blade profile is less than 45%.

* * * * *